United States Patent [19]

O'Brian et al.

[11] 4,198,069
[45] Apr. 15, 1980

[54] FOLDING THREE-CORNERED VEHICLE

[76] Inventors: Edward D. O'Brian, 910 Iroquois Ave., Anaheim; William M. Plachy, 182 Cerco Rosado, San Marcos, both of Calif. 92801

[21] Appl. No.: 963,375

[22] Filed: Nov. 24, 1978

[51] Int. Cl.² .............................................. B62B 7/06
[52] U.S. Cl. ...................................... 280/42; 280/278; 280/652
[58] Field of Search .................. 280/42, 92, 651, 652, 280/653, 639, 287, 278; 180/208

[56] References Cited

U.S. PATENT DOCUMENTS

| | | | |
|---|---|---|---|
| 2,800,335 | 7/1957 | Clapp | 280/42 |
| 3,212,596 | 10/1965 | Johnson | 180/208 |
| 4,109,933 | 8/1978 | O'Brian | 280/653 |
| 4,122,638 | 10/1978 | O'Brian | 52/70 |

OTHER PUBLICATIONS

"Mathematical Models," Oxford University Press, Copyright 1961, pp. 236–238.

Primary Examiner—Richard A. Bertsch
Assistant Examiner—John A. Carroll
Attorney, Agent, or Firm—Edward D. O'Brian

[57] ABSTRACT

A wheeled vehicle primarily useful for play purposes can be constructed so that it can be manipulated or folded between an open position in which the vehicle can be used and a folded, relatively flat position in which it can conveniently be shipped and stored. The vehicle described includes sides or side panels which are connected by a front hinge and which are also connected by back and bottom panels. These back and bottom panels are hinged relative to one another and relative to the sides so as to permit folding and unfolding. Preferably the front hinge has a pivot pin which carries one of the wheels used to support the vehicle and which also carries a handle used in steering the vehicle. Other wheels are provided on the extremities of the sides remote from the front hinge.

8 Claims, 5 Drawing Figures

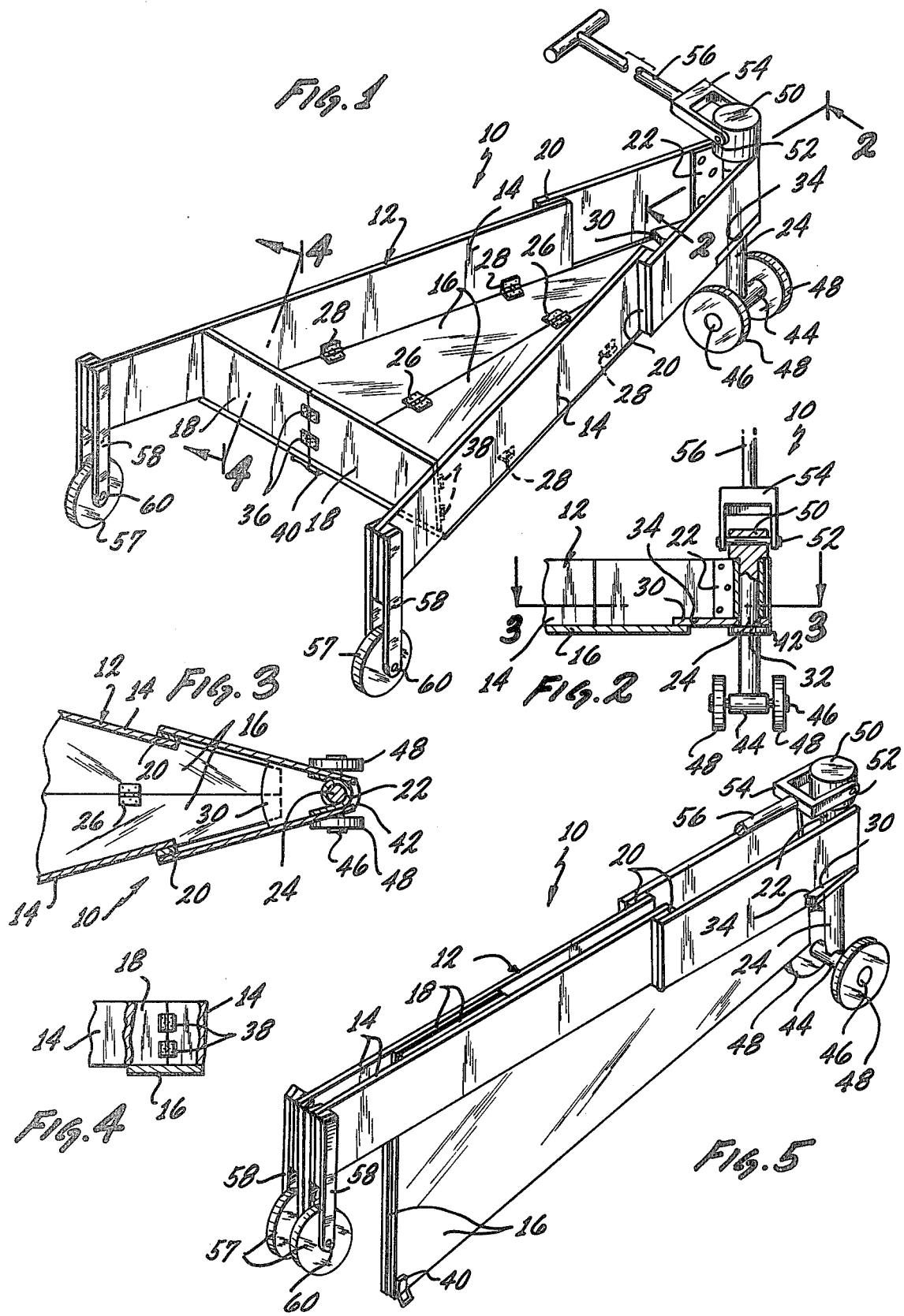

FOLDING THREE-CORNERED VEHICLE

BACKGROUND OF THE INVENTION

The invention set forth in this specification pertains to new and improved vehicles which are primarily intended to be utilized for play purposes. More specifically it pertains to vehicles which are in the nature of or closely related to conventional wagons and which are constructed so that they may easily and conveniently be manipulated or folded between an open, operative position and a folded, relatively flat position for shipment and storage.

The value of wagons and other closely related types of wheeled vehicles for play and utilitarian purposes is, of course, well established. It is believed that wagons and related toys are frequently not purchased for use by children because of the amount of space these items occupy when they are not in use. One problem faced in most housing units and frequently faced in nonhousing unit child care facilities is the problem of storage of various items of play equipment when such equipment is not in use. As a result of this problem frequently the amount of play equipment acquired for the use of children is severely limited.

SUMMARY OF THE INVENTION

Because of these considerations it is considered that a need exists for new and improved wheeled vehicles and in particular for wheeled vehicles reasonably corresponding to wagons as are used for play purposes. In connection with this it is considered that there is a need for such vehicles which are constructed in such a manner that they can be supplied by a manufacturer completely assembled and can be stored and shipped in a folded, relatively flat position or configuration but which are also constructed in such a manner that they can be easily and conveniently folded into or out of an open or utilitarian position or configuration.

A broad object of the present invention is to fulfill the need indicated in this discussion. More specific objectives of the invention are to provide new and improved folding vehicles which can be constructed at a comparatively nominal cost, which may be easily and conveniently folded and unfolded as indicated in the preceding discussion, which will normally be constructed in such a manner as to be capable of withstanding the usual abuse resulting from use by children and which may be shaped in such a manner as to be useful in a variety of different manners for play purposes.

The various objectives noted in the preceding are achieved by providing a wheeled vehicle primarily intended to be utilized for play purposes, said vehicle having a body and a plurality of wheels supporting said body in which the improvement comprises: said body including two side panels, two bottom panels, two back panels, front hinge means, two separate bottom-side edge hinge means, two separate back-side edge hinge means, bottom panel connecting hinge means and back panel connecting hinge means, said front hinge means connecting said side panels so that said side panels may be pivoted toward and away from one another, said bottom panel connecting hinge means connecting said bottom panels to one another so that they can be pivoted from a position in which they are located adjacent to one another, said bottom-side edge hinge means connecting portions of said bottom panels remote from said bottom panel connecting hinge means to said side panels so that as said sides are pivoted with respect to one another said bottom panels are also pivoted with respect to one another, said back panel connecting hinge means connecting said back panels to one another so that they can be pivoted from a position in which they are aligned with one another to a position in which they are located adjacent to one another, said back-side edge hinge means connecting portions of said bottom panels remote from said bottom panel connecting hinge means to said sides so that as said sides are pivoted with respect to one another said back panels are also pivoted with respect to one another, all of said hinge means, and all of said panels being connected so as to permit said body to be manipulated between an open position in which said side panels diverge away from said front hinge means and in which said bottom panels and said back panels extend between said side panels so as to serve as the bottom and the back of said body and a folded position in which said side panels are located closely adjacent to one another, said bottom panels are located closely adjacent to one another and said back panels are also located closely adjacent to one another, at least one front wheel mounted on said body adjacent to said front hinge means and beneath said body when said body is in said open position, at least one wheel located at the extremity of each side panel remote from said front hinge means and beneath said body when said body is in said open position.

BRIEF DESCRIPTION OF THE DRAWING

The invention is best more fully described with reference to the accompanying drawing in which:

FIG. 1 is an isometric view of a presently preferred embodiment or form of a wheeled vehicle in accordance with this invention in an open or ready-for-use position or configuration;

FIG. 2 is a partial cross-sectional view at an enlarged scale taken at line 2—2 of FIG. 1;

FIG. 3 is a partial cross-sectional view taken at line 3—3 of FIG. 2;

FIG. 4 is a partial cross-sectional view taken at line 4—4 of FIG. 1; and

FIG. 5 is a view corresponding to FIG. 1 of the vehicle shown in FIG. 1 in a folded or collapsed position or configuration.

The particular vehicle illustrated in the drawing is designed so as to utilize the essentially intangible concepts or principles of the invention set forth and defined in the appended claims. It is believed that those skilled in the field of the invention—the field of the design and construction of essentially toy vehicles such as wagons and the like primarily useful for play purposes—will be able to adapt these concepts or principles into a variety of somewhat differently appearing and differently constructed toys and various related structures through the use or exercise of routine engineering skill in this field.

DETAILED DESCRIPTION

In the drawing there is shown a folding three-cornered vehicle 10 in accordance with this invention which is constructed so as to include a body 12 capable of being manipulated between open and closed positions as indicated in the preceding discussion and as shown in FIGS. 1 and 5. This body 12 includes two side panels 14, two identical bottom panels 16, and two identical back panels 18. The side panels 14 are provided with comparatively small offsets 20 as shown in the drawing in order to accommodate a comparatively large front hinge 22 having an elongated hinge pin 24 so that the axis (not shown) of the pin 24 will permit the side panels 14 to be pivoted or folded between positions as shown in FIGS. 1 and 5.

The bottom panels 16 are joined together by bottom panel connecting hinges 26 and they are also joined to the side panels 14 by two different sets of bottom-side-edge hinges 28. These hinges 26 and 28 are located so that their axes (not separately indicated) are in a common flat plane when the body 12 is open as indicated in FIG. 1. These hinges 26 and 28 are also located so that their axes meet in a common point (not separately indicated) which is coincident with the axis of the pin 24. This relationship is considered quite important with the present invention in enabling the bottom panels 16 to fold between a position as shown in FIG. 1 in which they are aligned with one another and a position as shown in FIG. 5 in which they are located adjacent to or against one another.

It will be realized from a consideration of this folding action that if the bottom panels 16 were extended to complete lengths of the side panels 14 that these bottom panels 16 would occupy the same space as part of the pin 24. Because of this factor these bottom panels 16 are not of a purely triangular shape but are instead shaped as identical right-angle trapezoids. Preferably a small arcuate plate 30 having a hole 32 to accommodate the pin 24 is mounted on one of the side panels 14 beneath the front hinge 22 so as to overlie and cover the space (unnumbered) generally beneath the hinge 22 and between the hinge 22 and the bottom panels 16. A small notch 34 is provided in a side panel 16 to receive and accommodate movement of the plate 30 during the movement of the side panels 14 between the two positions indicated in FIGS. 1 and 5. In essence this plate 30 closes off and forms a part of the bottom (not separately numbered) of the body 12 when this body is in an open or unfolded position or configuration.

In the body 12 the back panels 18 are joined together by back panel connecting hinges 36. Two sets of back side edge connecting hinges 38 are used so that each of the back panels 18 is connected to one of the side panels 14. It is quite important that the axes (not separately indicated) of the hinges 36 and 38 be parallel to one another so as to permit or accommodate folding of the back panels 18 as the side panels 14 are pivoted or folded with respect to one another. In the precise structure shown the hinges 36 and 38 are offset in the sense that they are located on opposite sides (not separately numbered) of the back panels 18 in order to achieve a toggle or toggle-type action which tends to hold the body 12 in an open position once it has been completely manipulated to this position.

This toggle or toggle-type action requires a reasonably careful construction of the body 12. In order to achieve this action the bottom panels 16 and the various hinges 26 and 28 must be constructed so as to limit the amount that the side panels 14 may be pivoted away from one another to an arc which is sufficiently related to the dimensions of the back panels 18 and the tolerances of the hinges 36 and 38 so that in the final or open position of these back panels 18 they hold the side panels 14 so that the bottom panels 16 are under tension. Because of the thickness of the back panels 18 and the locations of the hinges 36 and 38 the back panels 18 may only be located in an open, aligned or coplanar position as shown in FIG. 1 as the result of temporary material deformation or "popping" through an overcenter position when movement of the side panels 14 is limited as indicated.

It is possible to construct the body 12 so that the toggle or toggle-type action indicated in the preceding will be adequate to completely hold the body 12 in an open position. However, because of the nature of play activities and because of the fact that the bottom panels 16 are connected so that the hinges 26 move downwardly during folding from an open position it is preferred to locate on the bottom panels 16 a small conventional latch or latch structure 40 which may be utilized to secure the panels 16 against folding with respect to one another. It will be realized that the construction of the body 12 is of such a character that a latch corresponding to the latch 40 can be utilized in many different locations. Virtually any type of a conventional latch mechanism may be utilized as the latch 40.

It is preferred to utilize a common overcenter toggle or suitcase-type latch because such a latch does not become easily disengaged. Although the latch 40 may be used on the same surfaces (not separately numbered) as the hinges 26 it is preferred to locate the latch 40 on the bottom surfaces (not separately numbered) of the panels 16 remote from the hinges 26 in an essentially out of the way location where this latch 40 is not apt to be manipulated by a child.

The pin 24 of the front hinge 22 preferably is secured to and carries a thrust flange 42 which abuts against the plate 30 for the purpose of limiting movement of this pin 24 generally toward the body 12. Preferably a head 44 is provided on the pin 24 beneath the flange 42 for the purpose of carrying a short axle 46 upon which there are mounted two wheels 48. Generally downward movement of the pin 24 is prevented by an enlarged head 50 on the pin 24 resting against the side panels 14. A cross-shaft 52 extends through the head 50 for the purpose of carrying a yoke 54 forming a part of an elongated handle 56.

It is noted that the side panels 14 extend generally in back of the bottom panel 16 and the back panels 18 in locations where wheels 56 can be mounted on these side panels 14 by means of legs 58 without interfering with the folding and unfolding of the bottom panels 16. These wheels 56 are preferably held by axles 60 so that they are positioned parallel to one another when the body 12 is in an open position or configuration as shown.

It is believed that the manner in which the vehicle 10 may be used will be rather self-evident from a consideration of the vehicle 10 itself and from the preceding. When this vehicle 10 is in an open or unfolded position or configuration it can be used in much the manner as any wagon or wagon-type toy. It can be folded from this open position into a folded position by first opening the latch 40 and then by concurrently moving the bottom panels 16 generally toward the front hinge 22 and moving the bottom panels 16 generally away from between the side panels 14. Unfolding involves reverse movement. These are coordinated motions which occur simultaneously as the result of the linkage system employed.

The vehicle 10 can be modified so as to accept accommodations or variations in this linkage system so long as the axes of the various hinges indicated in the preceding discussion are arranged and coordinated to obtain Sarrus or Sarrus-type motion or substantially Sarrus or Sarrus-type motion. Thus, for example, if it is desired to provide a body 12 in which the side panels 14 extend upwardly and outwardly from the bottom panel 16 when the body 12 is in an open position the axes of the hinges 36 and 38 must intersect the axes of the pin 24 and the hinge 22. This will, of course, normally involve the back panels 18 sloping upwardly and outwardly from the bottom panels 16.

A number of other similar modifications and adaptations can, of course, be made in the vehicle 10. Various types of conventional type steering structures can be employed in lieu of the handle 56. In adapting the vehicle 10 for use as a form of child's walker conventional casters can be utilized in lieu of the precise wheels and wheel mountings indicated. It is not considered necessary to specifically enumerate and/or illustrate such variations since they are within routine skill in the field of the invention.

We claim:

1. A wheeled vehicle primarily intended to be utilized for play purposes, said vehicle having a body and a plurality of wheels supporting said body in which the improvement comprises:
   said body including two side panels, two bottom panels, two back panels, front hinge means, two separate bottom-side edge hinge means, two separate backside edge hinge means, bottom panel connecting hinge means and back panel connecting hinge means,
   said front hinge means connecting said side panels so that said side panels may be pivoted toward and away from one another,
   said bottom panel connecting hinge means connecting said bottom panels to one another so that they can be pivoted from a position in which they are aligned with one another to a position in which they are located adjacent to one another,
   said bottom-side edge hinge means connecting portions of said bottom panels remote from said bottom panel connecting hinge means to said side panels so that as said sides are pivoted with respect to one another said bottom panels are also pivoted with respect to one another,
   said back panel connecting hinge means connecting said back panels to one another so that they can be pivoted from a position in which they are aligned with one another to a position in which they are located adjacent to one another,
   said back-side edge means connecting portions of said bottom panels remote from said bottom panel connecting hinge means to said sides so that as said sides are pivoted with respect to one another said back panels are also pivoted with respect to one another,
   all of said hinge means, and all of said panels being connected so as to permit said body to be manipulated between an open position in which said side panels diverge away from said front hinge means and in which said bottom panels and said back panels extend between said side panels so as to serve as the bottom and the back of said body and a folded position in which said side panels are located closely adjacent to one another, said bottom panels are located closely adjacent to one another and said back panels are also located closely adjacent to one another,
   at least one front wheel mounted on said body adjacent to said front hinge means and beneath said body when said body is in said open position,
   at least one wheel located at the extremity of each side panel remote from said front hinge means and beneath said body when said body is in said open position.

2. A vehicle as claimed in claim 1 including:
   latch means secured to said body for holding said body in said open position.

3. A vehicle as claimed in claim 1 including:
   latch means located underneath said bottom panels when said body is in said open position for securing said bottom panels against folding so as to hold said body in said open position.

4. A vehicle as claimed in claim 1 wherein:
   said bottom-side edge hinge means, said backside hinge means, said bottom panel connecting hinge means and said back panel connecting hinge means are located with respect to one another, said bottom panels, said back panels and said side panels so that during manipulation of said body from said folded to said open position three of said hinge means move into a common flat plane and so that one of said connecting hinge means moves through an overcenter position as a result of temporary material deformation immediately prior to said body being manipulated into its final open position.

5. A vehicle as claimed in claim 1 wherein:
   said hinge means are connected to said panels so that said body is held in said open position by an overcenter toggle action.

6. A vehicle as claimed in claim 1 wherein:
   said front hinge means has a pivot pin, said pivot pin extending beneath said body when said body is in said open position,
   said front wheel being mounted on said pivot pin and including
   means for rotating said pivot pin so as to steer said vehicle connected to said pivot pin.

7. A vehicle as claimed in claim 6 wherein:
   said means for rotating said pivot pin comprises an elongated handle pivotally connected to said pivot pin.

8. A vehicle as claimed in claim 1 including:
   latch means located underneath said bottom panels when said body is in said open position for securing said bottom panels against folding so as to hold said body in said open position, and wherein
   said bottom-side edge hinge means, said backside hinge means, said bottom panel connecting hinge means and said back panel connecting hinge means are located with respect to one another, said bottom panels, said back panels and said side panels so that during manipulation of said body from said folded to said open position three of said hinge means move into a common flat plane and so that one of said connecting hinge means moves through an overcenter position as a result of temporary material deformation immediately prior to said body being manipulated into its final open position,
   said front hinge means has a pivot pin, said pivot pin extending beneath said body when said body is in said open position,
   said front wheel being mounted on said pivot pin and including
   means for rotating said pivot pin so as to steer said vehicle connected to said pivot pin, and wherein
   said means for rotating said pivot pin comprises an elongated handle pivotally connected to said pivot pin.

* * * * *